(12) United States Patent
Chen et al.

(10) Patent No.: US 10,488,580 B2
(45) Date of Patent: Nov. 26, 2019

(54) DISPLAY MODULE

(71) Applicant: Innolux Corporation, Miao-Li County (TW)

(72) Inventors: Chun-Fang Chen, Miao-Li County (TW); Wei-Yuan Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 408 days.

(21) Appl. No.: 15/451,486

(22) Filed: Mar. 7, 2017

(65) Prior Publication Data

US 2017/0276329 A1  Sep. 28, 2017

(30) Foreign Application Priority Data

Mar. 22, 2016 (TW) .............................. 105108861 A

(51) Int. Cl.
*H05K 1/11* (2006.01)
*F21V 8/00* (2006.01)
(52) U.S. Cl.
CPC .................................. *G02B 6/0083* (2013.01)
(58) Field of Classification Search
CPC ................................................... G02B 6/0083
See application file for complete search history.

(56) References Cited

U.S. PATENT DOCUMENTS

| 9,482,810 | B2 | 11/2016 | Choi et al. | |
| 2005/0185394 | A1* | 8/2005 | Sakamoto | G02B 6/0026 362/133 |
| 2008/0030645 | A1* | 2/2008 | Nam | G02F 1/133608 349/61 |
| 2009/0303426 | A1 | 12/2009 | Kim | |

FOREIGN PATENT DOCUMENTS

| CN | 101118051 A | 2/2008 |
| CN | 103369830 A | 10/2013 |
| CN | 104254205 A | 12/2014 |
| TW | 201223351 A1 | 6/2012 |

OTHER PUBLICATIONS

TIPO Office Action dated Sep. 21, 2016 in corresponding Taiwan application (No. 105108861).
CN Office Action dated Jul. 3, 2019, State Intellectual Property Office of the People's Republic of China, Application # 201610164601. 5, pp. 1-13.

\* cited by examiner

*Primary Examiner* — Andrew J Coughlin
(74) *Attorney, Agent, or Firm* — McClure, Qualey & Rodack, LLP

(57) ABSTRACT

A display module includes a display panel and a light source module adjacent to the display panel. The light source module includes a circuit element and light-emitting units on the circuit element. The circuit element includes a first circuit board region and a second circuit board region adjacent to each other. The first circuit board region includes conductive layer(s) of a quantity M including a first conductive layer. The second circuit board region includes an insulating layer and conductive layers of a quantity N. The conductive layers of the quantity N include a second conductive layer and a third conductive layer. The insulating layer is between the second conductive layer and the third conductive layer. The first conductive layer of the first circuit board region is electrically connected to the third conductive layer of the second circuit board region. M and N are integers. M≥1. N>M.

18 Claims, 5 Drawing Sheets

DISPLAY MODULE

This application claims the benefit of Taiwan application Serial No. 105108861, filed Mar. 22, 2016, the subject matter of which is incorporated herein by reference.

BACKGROUND

Field of the Disclosure

The disclosure relates in general to a display module, and more particularly to a display module comprising a light bar.

Description of the Related Art

Along with the development in consumer electronic products and communication products, a liquid crystal display (LCD) has been widely used in various consumer electronic products and communication products such as liquid crystal TVs, notebook computers, desktop computers and smart phones. Generally speaking, the LCD includes a liquid crystal display panel and a backlight module. Light-emitting units of a light bar of the back light module can be provided as a light source to the display panel.

A design increasing an AP Ratio is used to improve a phenomenon of bright and dark band periodical distribution caused by lacking of uniformity of mixed lights. The A value indicates a distance between the light-emitting units and a viewable area of the display panel. The P value indicates a distance between adjacent two of the light-emitting units.

Using a double-layer circuit board (double-conductive-layer circuit board) for layouts for light-emitting units of series connection can obtain a light source module of a small width. However, cost for manufacturing the double-layer circuit board is high. When using the single-layer circuit board (single-conductive-layer circuit board) having a lower cost, layout designs for light-emitting units of series connection would be restricted to the single conductive layer layout, and it retards development of thinning the display module.

SUMMARY OF THE DISCLOSURE

The disclosure is directed to a display module.

According to an embodiment, a display module is disclosed. The display module comprises a display panel and a light source module adjacent to the display panel. The light source module comprises a circuit element and light-emitting units. The light-emitting units are on the circuit element. The circuit element comprises a first circuit board region and a second circuit board region. The second circuit board region is adjacent to the first circuit board region. The first circuit board region comprises conductive layer(s) of a quantity M. The conductive layer(s) of the quantity M comprises a first conductive layer. The second circuit board region comprises an insulating layer and conductive layers of a quantity N. The conductive layers of the quantity N comprise a second conductive layer and a third conductive layer. The insulating layer is between the second conductive layer and the third conductive layer. The first conductive layer of the first circuit board region is electrically connected to the third conductive layer of the second circuit board region. M and N are integers. M≥1. N>M.

According to an embodiment, a display module is disclosed. The display module comprises a display panel and a light source module. The light source module is adjacent to the display panel. The light source module comprises a circuit element and a first series-light-source group. The first series-light-source group comprises light-emitting units. The light-emitting units of the first series-light-source group are electrically connected in series and arranged along an arranging direction on the circuit element. The circuit element comprises a first circuit board region. The first circuit board region comprises a first conductive layer. The first conductive layer comprises an outer layout group. The outer layout group comprises a first outer layout and a second outer layout. The first outer layout and the second outer layout are respectively contact with a first outer contact end and a second outer contact end of the light-emitting units. An arrangement region is defined between a first fictitious edge and a second fictitious edge opposing to the first fictitious edge. The first fictitious edge and the second fictitious edge are defined by extending and connecting outer elemental edges of the light-emitting units corresponding to the arranging direction. The first outer layout and the second outer layout respectively have at least one first fictitious intersection point and at least one second fictitious intersection point with an edge of the arrangement region. One of the at least one first fictitious intersection point and one of the at least one second fictitious intersection point are both at the first fictitious edge. The one of the at least one first fictitious intersection point has a shortest distance to the first outer contact end among the at least one first fictitious intersection point. The one of the at least one second fictitious intersection point has a shortest distance to the second outer contact end among the at least one second fictitious intersection point.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Embodiments of the present disclosure relate to a display module. A light-emitting module of the display module uses a circuit element formed by circuit board structures having different quantities of conductive layers. The circuit board structure having a smaller quantity of the conductive layer can be used for reducing manufacturing cost. For example, the circuit element formed by the circuit board structure of single (conductive) layer and the circuit board structure of double (conductive) layers can be used for decreasing manufacturing cost. In addition, a single conductive layer is designed to comprise outer layouts extended across a series-light-source group and gathered in a region portion closer to the display panel, and thus a region portion farther away from the display panel can have a smaller width. Therefore, a demand of a thin type display device can be achieved with a prerequisite of a desired A value.

It should be noted that although the present disclosure does not illustrate all possible embodiments, other embodiments not disclosed in the present disclosure are still applicable. Moreover, the dimension scales used in the accompanying drawings are not based on actual proportion of the product. Therefore, the specification and drawings are for explaining and describing the embodiment only, not for limiting the scope of protection of the present disclosure. Furthermore, descriptions of the embodiments, such as detailed structures, manufacturing procedures and materials, are for exemplification purpose only, not for limiting the scope of protection of the present disclosure. Suitable modifications or changes can be made to the structures and procedures of the embodiments to meet actual needs without breaching the spirit of the present disclosure. Designations common to the accompanying drawings are used to indicate identical or similar elements.

Figure 1:
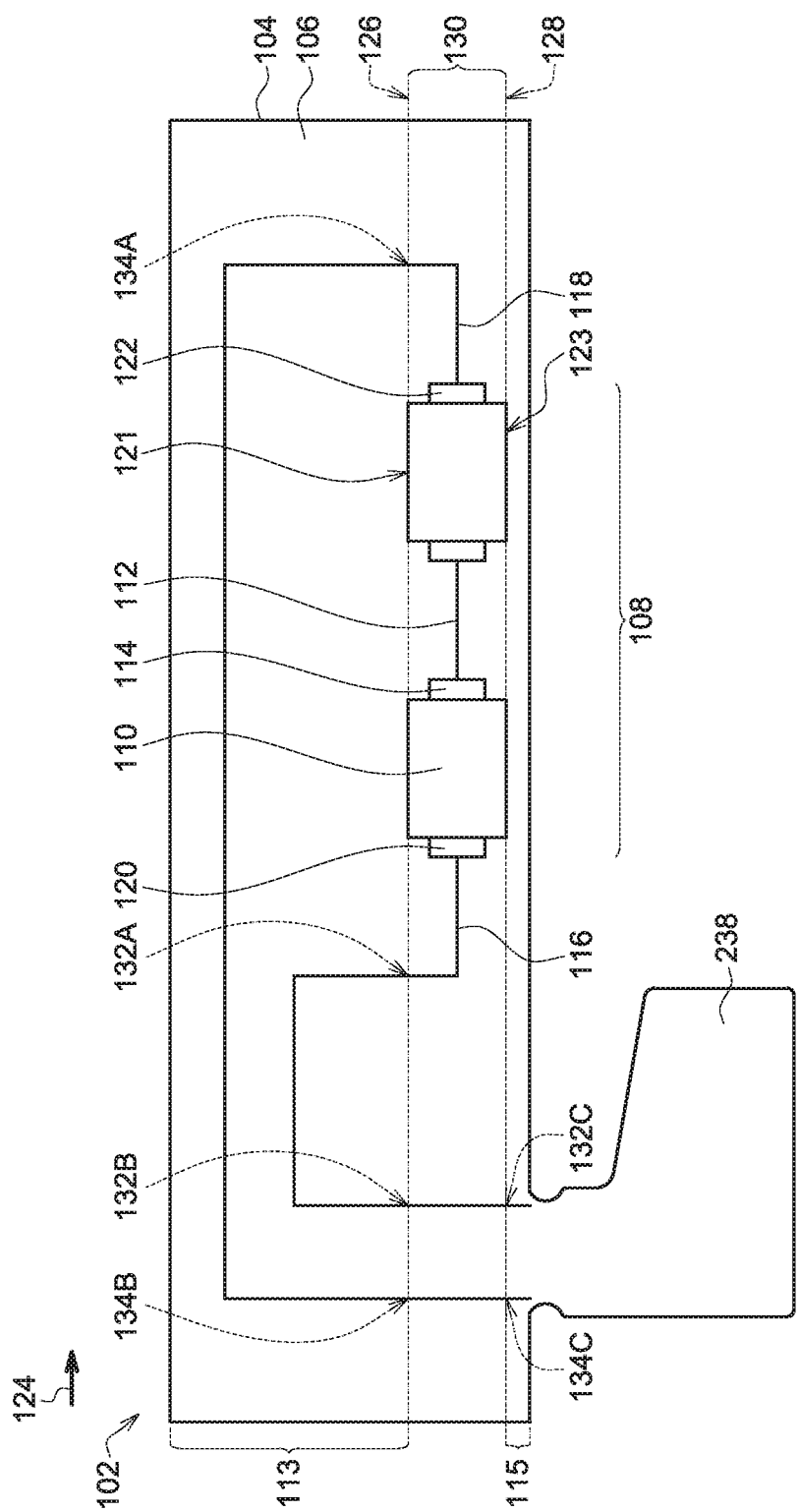
FIG. 1 illustrates a light source module of a display module according to an embodiment.

FIG. 1 illustrates a light source module 102 of a display module according to an embodiment. The light source module 102 comprises a circuit element 104 and a first series-light-source group 108 disposed on a first circuit board region 106 of the circuit element 104. In embodiments, the first circuit board region 106 is a single-layer circuit board, and in other words a quantity (M) of a conductive layer is 1, or the first circuit board region 106 has only one conductive layer. Therefore, layouts of the first circuit board region 106 are all in the same conductive layer. In embodiments, the first series-light-source group 108 comprises light-emitting units 110 of a quantity K. K is at least 2. FIG. 1 uses the first series-light-source group 108 having two light-emitting units 110 to illustrate concepts of embodiments. The light-emitting units 110 may comprise light-emitting diodes.

The circuit element 104 may comprise an inner layout group and an outer layout group corresponding to the first series-light-source group 108. The inner layout group may comprise an inner layout 112 contact with (i.e. electrically connected with and physically connected with) inner contact ends 114 of the light-emitting units 110. The outer layout group may comprise a first outer layout 116 and a second outer layout 118, respectively contact with (i.e. electrically connected with and physically connected with) a first outer contact end 120 and a second outer contact end 122 of the first series-light-source group 108. The light-emitting units 110 arranged along an arranging direction 124 are electrically connected in series through the inner layout 112. The light-emitting units 110 may be electrically connected to an external negative electrode and an external positive electrode through the first outer layout 116 and the second outer layout 118 respectively.

Outer elemental edges of the light-emitting units 110 (such as outer edge 121, outer edge 123 of light-emitting diodes) may be extended corresponding to the arranging direction 124 to connect to each other to define a first fictitious edge 126 and a second fictitious edge 128 opposing to the first fictitious edge 126. An arrangement region 130 is defined between the first fictitious edge 126 and the second fictitious edge 128.

In embodiments, the first outer layout 116 and the second outer layout 118 are respectively extended from the first outer contact end 120 and the second outer contact end 122 into a first region portion 113 outside of the first fictitious edge 126 of the circuit element 104, and then toward a second region portion 115 outside of the second fictitious edge 128 of the circuit element 104. The arranging method results in at least one first fictitious intersection point (such as first fictitious intersection point 132A, first fictitious intersection point 132B, first fictitious intersection point 132O shown in FIG. 1) between the first outer layout 116 and the edges (comprising the first fictitious edge 126 and the second fictitious edge 128) of the arrangement region 130, and at least one second fictitious intersection point (such as second fictitious intersection point 134A, second fictitious intersection point 134B, second fictitious intersection point 134O shown in FIG. 1) between the second outer layout 118 and the edges (comprising the first fictitious edge 126 and the second fictitious edge 128) of the arrangement region 130.

The first outer contact end 120 has the shortest distance with the first fictitious intersection point 132A among the first fictitious intersection point 132A, the first fictitious intersection point 132B, and the first fictitious intersection point 132O. The second outer contact end 122 has the shortest distance with the second fictitious intersection point 134A among the second fictitious intersection point 134A, the second fictitious intersection point 134B, and the second fictitious intersection point 134O. In embodiments, the first fictitious intersection point 132A and the second fictitious intersection point 134A are both at the first fictitious edge 126.

Figure 2:
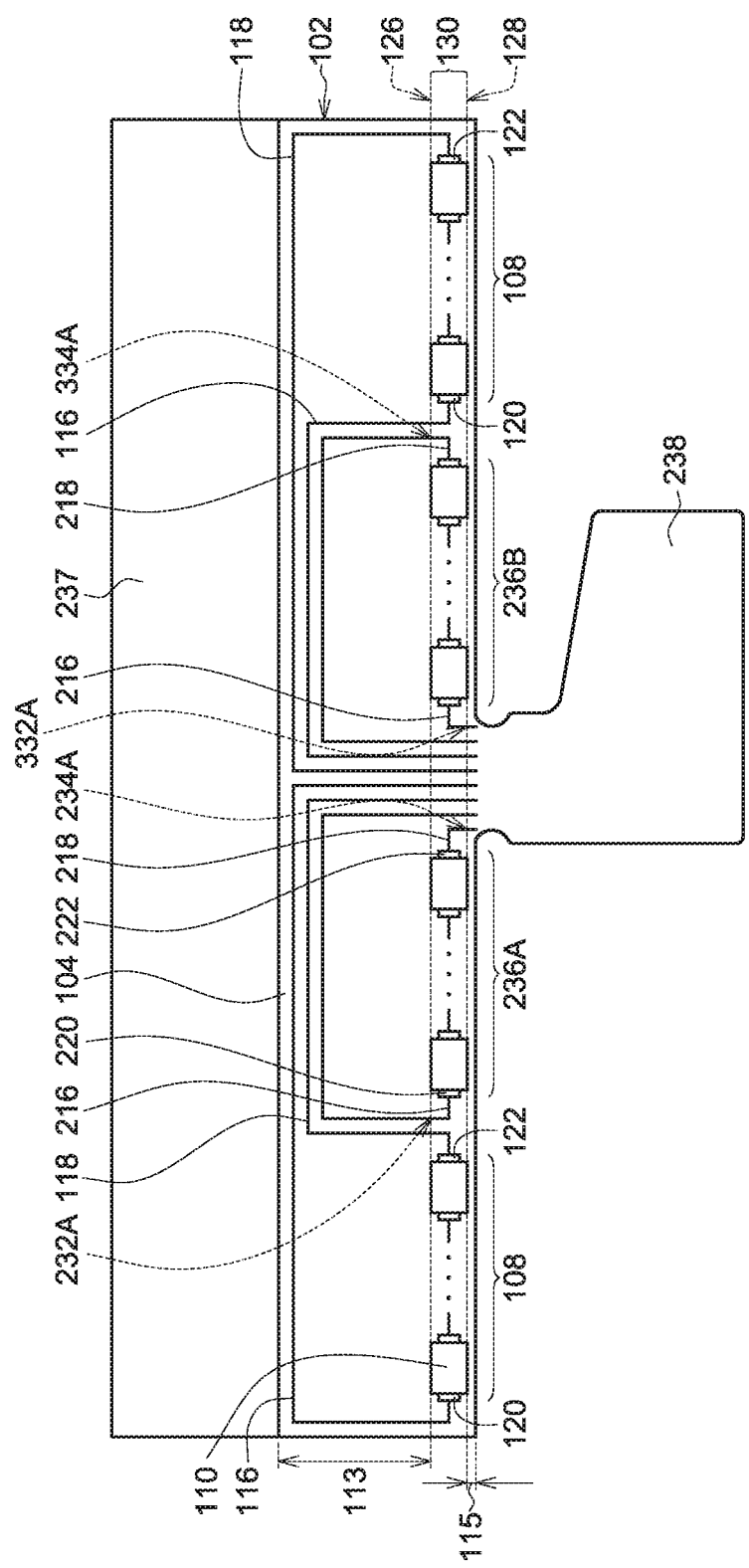
FIG. 2 illustrates a display module according to an embodiment.

FIG. 2 illustrates a display module according to an embodiment. In an embodiment, a display panel 237 is a liquid crystal display panel. The light source module 102 is a back light module for providing a light source to the display panel 237. In other embodiments, concepts according to the disclosed embodiments may be applied for other kinds of display modules.

The light source module 102 may comprise a second series-light-source group 236A, a second series-light-source group 236B. Differences between the second series-light-source group 236A, the second series-light-source group 236B and the first series-light-source group 108 are described as following. The second series-light-source group 236A comprises a first outer layout 216 routed from a first outer contact end 220 upward into the first region portion 113 outside of the first fictitious edge 126, cross the second series-light-source group 236A, and then toward the second region portion 115 outside of a second outer contact end 222 downward to an connecting portion 238. The second series-light-source group 236A comprises a second outer layout 218 routed from the second outer contact end 222 downward to the connecting portion 238. A second series-light-source group 236B comprises the second outer layout 218 routed from the second outer contact end 222 upward into the first region portion 113, across the second series-light-source group 236B, and then downward to the connecting portion 238. The second series-light-source group 236B comprises the first outer layout 216 routed from the first outer contact end 220 downward to the connecting portion 238. The arranging method results in the following structure. A first fictitious intersection point 232A of the first outer layout 216 of the second series-light-source group 236A and the edges of the arrangement region 130 having the shortest distance to the first outer contact end 220 is at the first fictitious edge 126. A second fictitious intersection point 234A of the second outer layout 218 of the second series-light-source group 236A and the edges of the arrangement region 130 having the shortest distance to the second outer contact end 222 is at the second fictitious edge 128. A first fictitious intersection point 332A of the first outer layout 216 of the second series-light-source group 236B and the edges of the arrangement region 130 having the shortest distance to the first outer contact end 220 is at the second fictitious edge 128. In addition, a second fictitious intersection point 334A of the second outer layout 218 of the second series-light-source group 236B and the edges of the arrangement region 130 having the shortest distance to the second outer contact end 222 is at the first fictitious edge 126.

In embodiments, the first outer layout 116 and the second outer layout 118 of the first series-light-source group 108 are respectively routed from the first outer contact end 120 and the second outer contact end 122 into the first region portion 113 outside of the first fictitious edge 126, across other series-light-source groups (such as the second series-light-source group 236A, the second series-light-source group 236B), and then downward to the connecting portion 238 outside of the second fictitious edge 128.

The first outer layout 116 and the second outer layout 118 of the first series-light-source group 108, the first outer layout 216 of the second series-light-source group 236A, the second outer layout 218 of the second series-light-source group 236B, across the series-light-source group(s), are gathered in the first region portion 113 outside of the first fictitious edge 126 adjacent to the display panel 237, thus the first region portion 113 can be designed to have a larger width. The first region portion 113 having the larger width can improve a gap distance between the light-emitting units 110 and the display panel 237, i.e. the expected A value. Meanwhile, there is no layout extended transversely in the second region portion 115 outside of the second fictitious edge 128 away from the display panel 237, thus the second region portion 115 can be designed to have a smaller width. Therefore, a thin type display device with the expected desire A value for demand can be realized.

The light source module 102 may further comprise a light guide plate (not shown) for guiding a light emitted from the light-emitting units 110 to the display panel 237. In embodiments, the light guide plate may be designed to have a rough surface for improving effect of mixing light.

Figure 3:
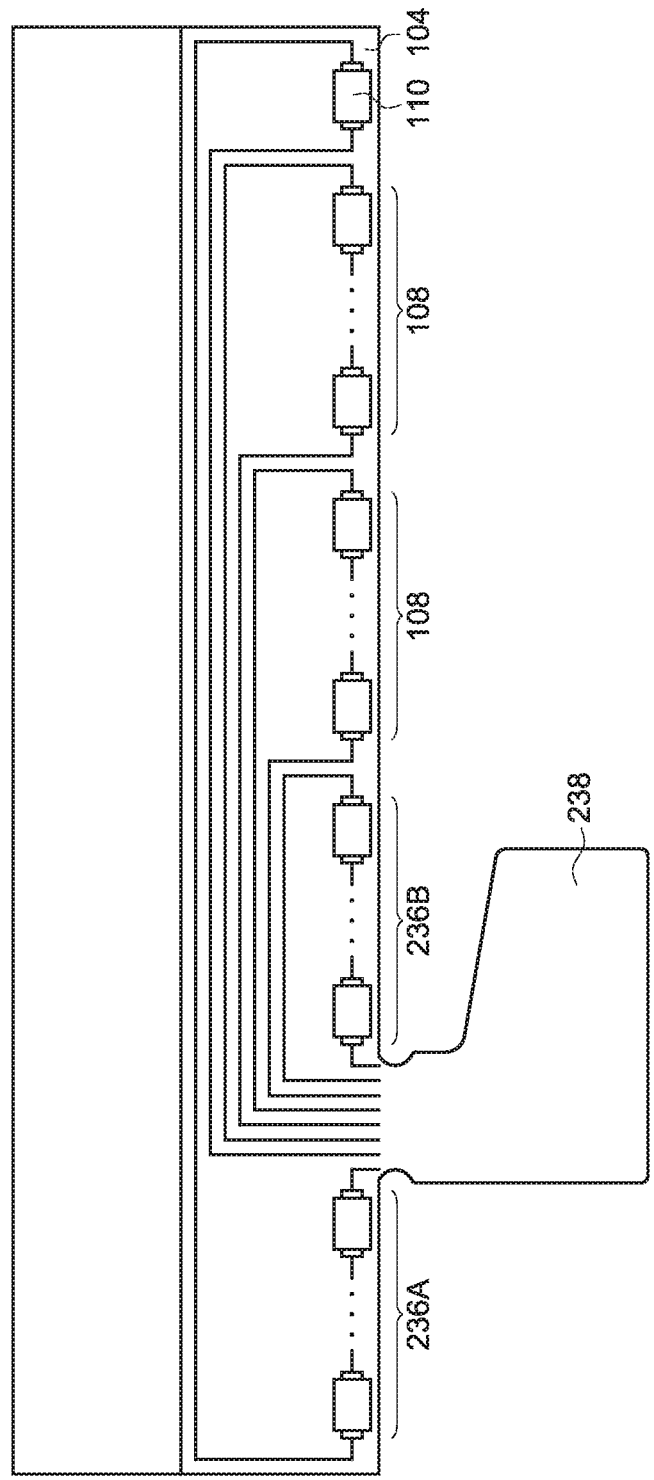
FIG. 3 illustrates a display module according to another embodiment.

FIG. 3 illustrates a display module according to another embodiment. Differences between the display module shown in FIG. 3 and the display module shown in FIG. 2 are described as following. The connecting portion 238 is arranged between the left two second series-light-source group 236A and second series-light-source group 236B. One of the light-emitting units 110 of the second series-light-source group 236A is disposed on a right side of the first series-light-source groups 108, and the others of light-emitting units 110 of the second series-light-source group 236A is disposed on a left side of the first series-light-source groups 108.

In embodiments, the circuit element 104 uses a composite circuit element formed by using circuit board structures having different quantities of conductive layers. Using a circuit board structure having a smaller quantity of conductive layer can reduce a manufacturing cost. For example, the circuit element 104 may be a composite circuit element comprising a single-layer circuit board structure (single-conductive-layer circuit board structure) and a double-layer circuit board structure (double-conductive-layer circuit board structure). Cost for the single-layer circuit board structure is lower than cost for the double-layer circuit board structure, thus using the single-layer circuit board structure can decrease cost for manufacturing the circuit element 104. The double-layer circuit board structure can be flexible for designing layout.

Figure 4:
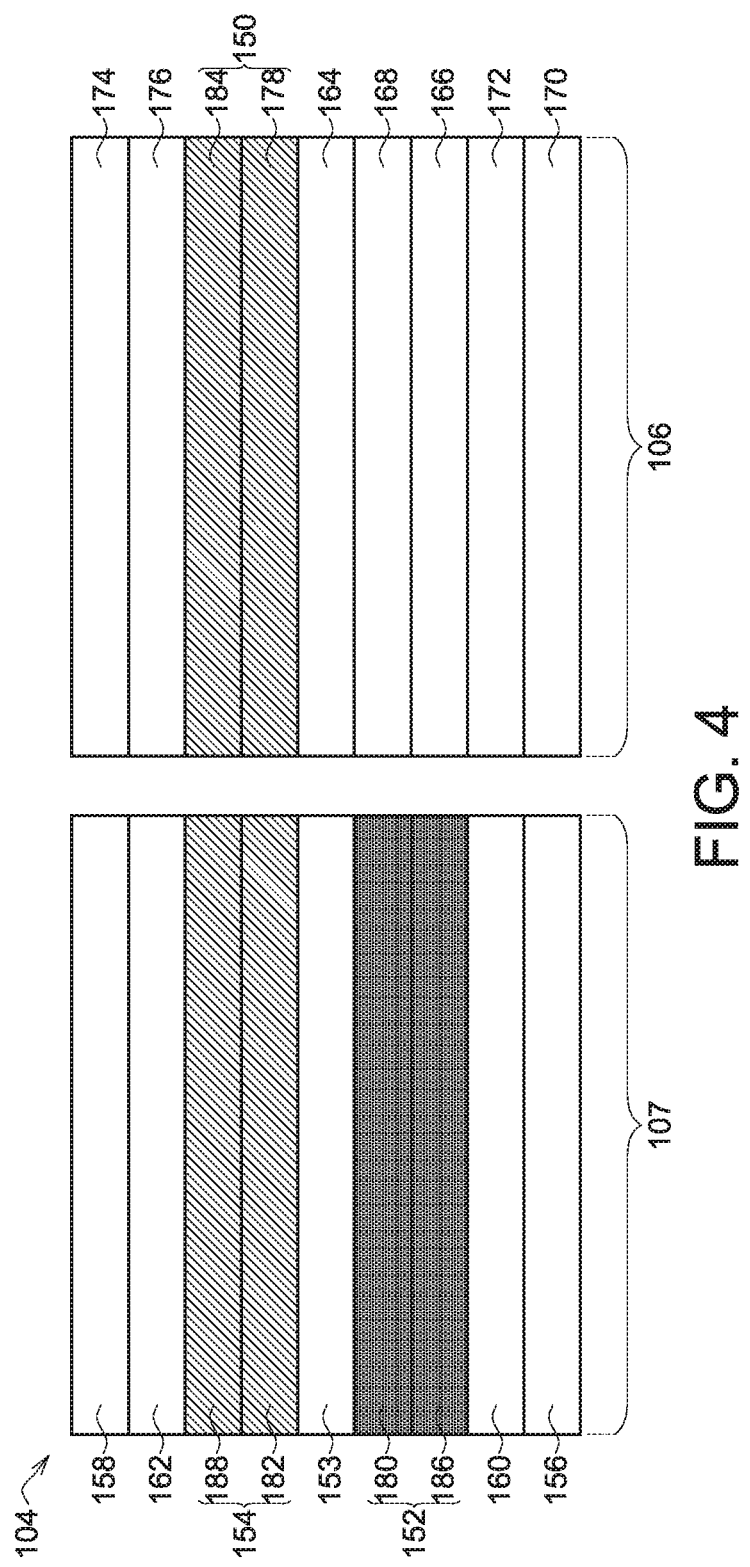
FIG. 4 illustrates a cross-section view of a circuit element according to an embodiment.

FIG. 4 illustrates a cross-section view of a circuit element 104 according to an embodiment. The circuit element 104 comprises the first circuit board region 106 and a second circuit board region 107 adjacent to the first circuit board region 106. The first circuit board region 106 comprises M conductive layer(s). The second circuit board region 107 comprises N conductive layers. M and N are integers. M≥1. N>M.

In embodiments, the M conductive layer of the first circuit board region 106 comprises a first conductive layer 150. In an embodiment, for example, the first circuit board region 106 is a single-layer circuit board structure, and in other words the M conductive layer has only one layer of the first conductive layer 150, or M=1.

In embodiments, the N conductive layers of the second circuit board region 107 comprises a second conductive layer 152 and a third conductive layer 154. In an embodiment, for example, the first circuit board region 106 is a double-layer circuit board structure, and in other words the M conductive layer may have only the second conductive layer 152 and the third conductive layer 154, or M=2.

The first conductive layer 150 may be physically (directly) connected with, or electrically connected to the third conductive layer 154. In embodiments, the first circuit board region 106 and the second circuit board region 107 may be formed through a stacking design to make the first conductive layer 150 and the third conductive layer 154 at the same height position, having a coplanar structure, having the same thickness, formed at the same time, or being a continuous conductive film (physically connected to each other), in a stacked structure.

For example, the second conductive layer 152 and the third conductive layer 154 of the second circuit board region 107 may be formed on a lower surface and an upper surface of an insulating layer 153 respectively. Thus, the insulating layer 153 is between the second conductive layer 152 and the third conductive layer 154. An insulating layer 156 and an insulating layer 158 may be attached to the second conductive layer 152 and the third conductive layer 154 through an adhesive layer 160 and an adhesive layer 162 respectively. The first conductive layer 150 of the first circuit board region 106 may be formed on an insulating layer 164. An insulating layer 166 may be attached to the insulating layer 164 through an adhesive layer 168. An insulating layer 170 may be attached to the insulating layer 166 through an adhesive layer 172. An insulating layer 174 may be attached to the first conductive layer 150 through an adhesive layer 176.

In an embodiment, for example, the first circuit board region 106 and the second circuit board region 107 of the circuit element 104 may be flexible circuit boards. Materials for the circuit element 104 may comprise flexible materials. For example, as shown in FIG. 4, the first conductive layer 150 may comprise a conductive film 178 and a conductive film 184. The second conductive layer 152 may comprise a conductive film 180 and a conductive film 186. The third conductive layer 154 may comprise a conductive film 182 and a conductive film 188. In an embodiment, the conductive film 178, the conductive film 180, the conductive film 182 may be rolled and annealed (RA) metal films, but not limited thereto. The conductive film 184, the conductive film 186, the conductive film 188 may be plated metal films, but not limited thereto. The metal films may comprise copper or using other suitable conductive materials. The insulating layer 153, the insulating layer 156, the insulating layer 158, the insulating layer 164, the insulating layer 166, the insulating layer 170, the insulating layer 174 may comprise polyimide (PI), or other suitable dielectric materials. The adhesive layer 160, the adhesive layer 162, the adhesive layer 168, the adhesive layer 172, the adhesive layer 176 may comprise an adhesive layer made from a glue, such as a glass fiber resin (PP), an epoxy, a poly(acrylic acid), etc, but are not limited thereto. In embodiments, each of the conductive layers is not limited to the two-layer structure as shown in the figure, and may be a single conductive (or metal) layer structure, or a (more than two) conductive (or metal) layer structure. Each of the insulating layers is not limited to the single-layer structure as shown in the figure, and may be a multi-layer structure.

Figure 5:
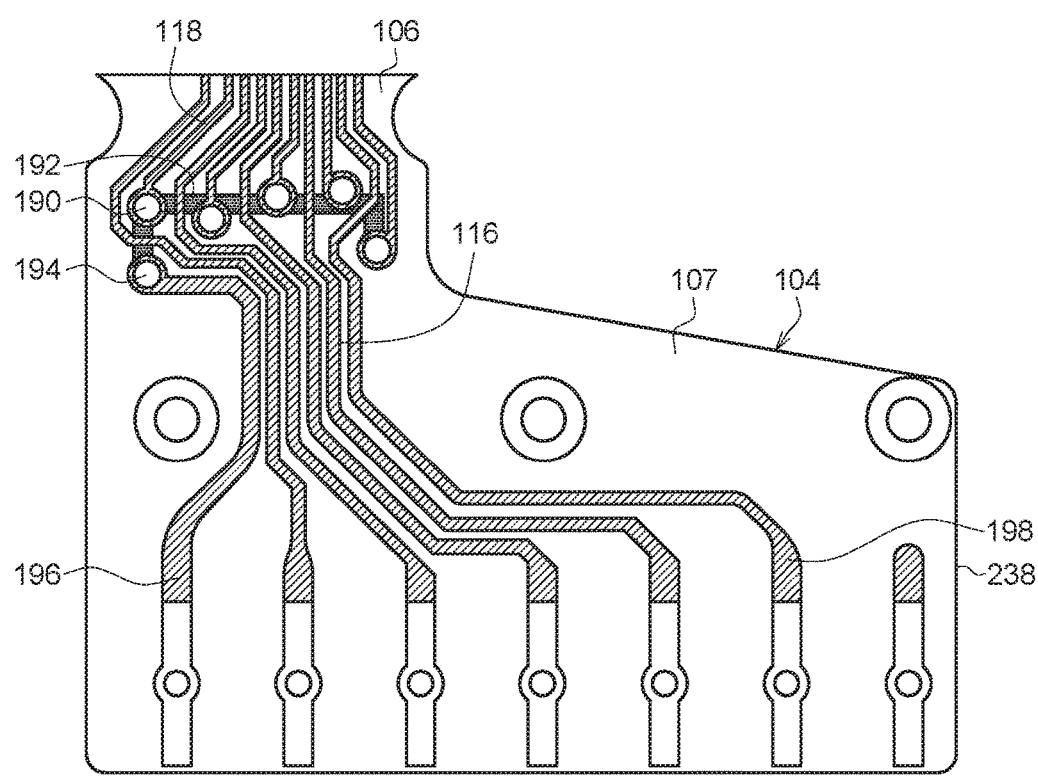
FIG. 5 illustrates a perspective view of a connecting portion of a circuit element according to an embodiment.

FIG. 5 illustrates a perspective view of a connecting portion 238 of a circuit element 104 according to an embodiment. The first outer layout 116 comprises the first conductive layer 150 (FIG. 4) of the first circuit board region 106, and the third conductive layer 154 (FIG. 4) of the second circuit board region 107. The second outer layout 118 may comprise the first conductive layer 150 of the first circuit board region 106, and may be electrically connected to a common (commonly used) conductive line 192 formed by the second conductive layer 152 through a conductive via 190 between the second conductive layer 152 and the third conductive layer 154 (FIG. 4) in the second circuit board region 107. The common conductive line 192 is electrically connected to a conductive pin 196 formed by the third conductive layer 154 through a conductive via 194. A golden finger portion of the connecting portion 238, formed by a conductive pin 198 formed by the first outer layout 116 in the second circuit board region 107 and the conductive pin 196, may be used for electrically connecting to an external electrical device. The first outer layout 216 of the second series-light-source group 236A, the second series-light-source group 236B (FIG. 2, FIG. 3) may be designed as the first outer layout 116, the second outer layout 218 may be designed as the second outer layout 118, and thus is not described in detail herein. In an embodiment, the conductive pin 196 commonly connected by the second outer layouts 118 (and the second outer layouts 218) is electrically connected to a positive electrode (such as $V_{cc}$), and the conductive pins 198 respectively electrically connected to the first outer layouts 116 (and the first outer layouts 216) are electrically connected to a negative electrode (such as $V_{fb}$).

According to embodiments, the circuit element 104 is not limited to a composite structure formed by using the single-layer circuit board structure and the double-layer circuit board structure. In other embodiments, the circuit element 104 may use a composite circuit board structure comprising other quantities of the conductive layers.

According to the foregoing embodiments, the circuit element of the light-emitting module uses a composite structure comprising the single-layer circuit board and the double-layer circuit board. The conductive lines of single-layer circuit board structure is designed to have portions of the outer layouts across the series-light-source group to be gathered in the first region portion adjacent to the display panel. Thus the second region portion away from the display panel can be designed to have a smaller width. Therefore, a thin-type display device with an expected desire A value complying demands can be realized.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A display module, comprising:
a display panel; and
a light source module adjacent to the display panel, wherein the light source module comprises a circuit element and a plurality of light-emitting units, the plurality of light-emitting units is on the circuit element, wherein,
the circuit element comprises a first circuit board region, a second circuit board region, outer layout groups and conductive vias, the second circuit board region is adjacent to the first circuit board region,
the first circuit board region comprises M conductive layer, wherein the M conductive layer comprises a first conductive layer,
the second circuit board region comprises an insulating layer and N conductive layers, wherein the N conductive layers comprise a second conductive layer and a third conductive layer, the insulating layer is between the second conductive layer and the third conductive layer,
the first conductive layer of the first circuit board region is electrically connected to the third conductive layer of the second circuit board region, M and N are integers, M≥1, N>M,
the outer layout groups comprise first outer layouts and second outer layouts, the first outer layouts and the second outer layouts of the outer layout groups are respectively contact with first outer contact ends and second outer contact ends of the plurality of the light-emitting units,
the first outer layouts of the outer layout groups comprise the first conductive layer and the third conductive layer,
the conductive vias are electrically connected between the second conductive layer and the third conductive layer.

2. The display module according to claim 1, wherein the first conductive layer of the first circuit board region and the third conductive layer of the second circuit board region are a coplanar structure.

3. The display module according to claim 1, wherein the second circuit board region comprises the conductive vias.

4. The display module according to claim 1, comprising a first series-light-source group, wherein
the first series-light-source group comprises the plurality of the light-emitting units, the plurality of the light-emitting units of the first series-light-source group is arranged along an arranging direction,
a first fictitious edge and a second fictitious edge opposing to the first fictitious edge are defined by extending and connecting outer elemental edges of the plurality of the light-emitting units corresponding to the arranging direction,
the circuit element comprises a first region portion, the first region portion is outside of the first fictitious edge,
In the first conductive layer, a first outer layout of the first outer layouts and a second outer layout of the second outer layouts corresponding to the first series-light-source group are extended toward the first region portion from a first outer contact end of the first outer contact ends and a second outer contact end of the second outer contact ends of the plurality of the light-emitting units respectively.

5. The display module according to claim 4, wherein the light source module comprises a second series-light-source group, the circuit element comprises a second region portion, the second region portion is outside of the second fictitious edge, the first outer layout and the second outer layout corresponding to the first series-light-source group are respectively extended from the first outer contact end and the second outer contact end into the first region portion, across the second series-light-source group in the first region portion, and then into the second region portion.

6. The display module according to claim 1, wherein the second outer layouts of the outer layout groups are electrically connected to a common conductive line through a group of the conductive vias, the common conductive line is formed by the second conductive layer.

7. The display module according to claim 6, wherein the second outer layouts of the outer layout groups comprise the first conductive layer.

8. The display module according to claim 6, wherein the common conductive line formed by the second conductive layer is electrically connected to a conductive pin through another group of the conductive vias, the conductive pin is formed by the third conductive layer.

9. The display module according to claim 8, wherein the first outer layouts in the second circuit board region and the conductive pin form a golden finger portion of the circuit element.

10. A display module, comprising:
a display panel; and
a light source module adjacent to the display panel, and comprising a circuit element and a first series-light-source group, wherein,
the first series-light-source group comprises a plurality of light-emitting units, plurality of light-emitting units of the first series-light-source group is electrically connected in series and arranged along an arranging direction on the circuit element,
the circuit element comprises a first circuit board region, wherein the first circuit board region comprises a first conductive layer, the first conductive layer comprises an outer layout group, the outer layout group comprises a first outer layout and a second outer layout, the first outer layout and a second outer layout are respectively contact with a first outer contact end and a second outer contact end of the plurality of the light-emitting units;
an arrangement region is defined between a first fictitious edge and a second fictitious edge opposing to the first fictitious edge, the first fictitious edge and the second fictitious edge are defined by extending and connecting outer elemental edges of the plurality of the light-emitting units corresponding to the arranging direction,
the first outer layout and the second outer layout respectively have at least one first fictitious intersection point and at least one second fictitious intersection point with an edge of the arrangement region,
one of the at least one first fictitious intersection point and one of the at least one second fictitious intersection point are both at the first fictitious edge, the one of the at least one first fictitious intersection point has a shortest distance to the first outer contact end, the one of the at least one second fictitious intersection point has a shortest distance to the second outer contact end.

11. The display module according to claim 10, wherein the first fictitious edge are closer to the display panel than the second fictitious edge.

12. The display module according to claim 10, wherein the light source module further comprises a second series-light-source group, wherein the circuit element comprises a first region portion and a second region portion, the first region portion is outside of the first fictitious edge, the second region portion is outside of the second fictitious edge, the first outer layout and the second outer layout corresponding to the first series-light-source group are respectively extended from the first outer contact end and the second outer contact end into the first region portion, across the second series-light-source group in the first region portion, and then into the second region portion.

13. The display module according to claim 10, wherein the circuit element further comprises a second circuit board region, the second circuit board region is adjacent to the first circuit board region, the second circuit board region comprises an insulating layer, a second conductive layer and a third conductive layer, the insulating layer is between the second conductive layer and the third conductive layer, the first conductive layer of the first circuit board region is electrically connected to the third conductive layer of the second circuit board region.

14. The display module according to claim 13, comprising a plurality of the outer layout groups, wherein the plurality of the outer layout groups comprises a plurality of the first outer layouts and a plurality of the second outer layouts, the plurality of the first outer layouts and the plurality of the second outer layouts are respectively contact with the first outer contact end and the second outer contact end of the plurality of the light-emitting units, wherein the circuit element further comprises conductive vias electrically connected between the second conductive layer and the third conductive layer.

15. The display module according to claim 14, wherein the plurality of the first outer layouts comprises the first conductive layer and the third conductive layer, the third conductive layer is electrically connected to the first conductive layer.

16. The display module according to claim 14, wherein the plurality of the second outer layouts is electrically connected to a common conductive line through a group of the conductive vias, the common conductive line is formed by the second conductive layer.

17. The display module according to claim 16, wherein the common conductive line is electrically connected to a conductive pin through another group of the conductive vias, the conductive pin is formed by the third conductive layer.

18. The display module according to claim 17, wherein the plurality of the first outer layouts in the second circuit board region and the conductive pin form a golden finger portion of the circuit element.

* * * * *